(12) United States Patent
Majcherczyk et al.

(10) Patent No.: US 12,328,202 B2
(45) Date of Patent: Jun. 10, 2025

(54) DEVICE, SYSTEM AND METHOD FOR CONTROLLING ENVIRONMENTAL DEVICES AT A SMART BUILDING TO ASSIST A FIRST RESPONDER

(71) Applicant: MOTOROLA SOLUTIONS, INC., Chicago, IL (US)

(72) Inventors: Dariusz Majcherczyk, Cracow (PL); Grzegorz Gustof, Cracow (PL); Pawel Wilkosz, Cracow (PL); Pawel Niemiec, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 379 days.

(21) Appl. No.: 17/797,639

(22) PCT Filed: Feb. 13, 2020

(86) PCT No.: PCT/PL2020/050017
§ 371 (c)(1),
(2) Date: Aug. 4, 2022

(87) PCT Pub. No.: WO2021/162561
PCT Pub. Date: Aug. 19, 2021

(65) Prior Publication Data
US 2023/0053823 A1    Feb. 23, 2023

(51) Int. Cl.
*H04L 12/28* (2006.01)
*H04M 11/04* (2006.01)

(52) U.S. Cl.
CPC ......... *H04L 12/2816* (2013.01); *H04M 11/04* (2013.01)

(58) Field of Classification Search
CPC ......... H04L 12/28; H04L 12/24; H04L 41/22; G06F 21/34; G06F 3/04; G06F 21/42;
(Continued)

(56) References Cited

U.S. PATENT DOCUMENTS 7,199,724 B2    4/2007   Danvir et al.
7,907,753 B2    3/2011   Wilson et al.
(Continued)

FOREIGN PATENT DOCUMENTS

CA    3021390 A1     10/2017
CN    102388678 A    3/2012
(Continued)

OTHER PUBLICATIONS

International Search Report mailed on Oct. 15, 2020, issued in the corresponding PCT Application No. PCT/PL2020/050017, Filed Feb. 13, 2020.
(Continued)

*Primary Examiner* — Man U Phan
(74) *Attorney, Agent, or Firm* — PERRY + CURRIER INC.

(57) ABSTRACT

A device, system and method for controlling environmental devices at a smart building to assist a first responder is provided. A public-safety computing device determiners a context of a first responder at a smart building. The public-safety computing device is in communication with a smart-building control device. The context comprises one or more of: an objective to be achieved by the first responder in the smart building; and an object-of-interest in the smart building for which evidence is to be collected. The public-safety computing device communicates with the smart-building control device, to control environmental devices at the smart building to assist the first responder with respect to the context.

19 Claims, 6 Drawing Sheets

300

302 — DETERMINING, AT A PUBLIC-SAFETY CONTROL DEVICE, A CONTEXT OF A FIRST RESPONDER AT A SMART BUILDING, THE PUBLIC-SAFETY CONTROL DEVICE IN COMMUNICATION WITH A SMART-BUILDING CONTROL DEVICE, THE CONTEXT COMPRISING ONE OR MORE OF: AN OBJECTIVE TO BE ACHIEVED BY THE FIRST RESPONDER IN THE SMART BUILDING; AND AN OBJECT-OF-INTEREST IN THE SMART BUILDING FOR WHICH EVIDENCE IS TO BE COLLECTED

304 — COMMUNICATING, AT THE PUBLIC-SAFETY CONTROL DEVICE, WITH THE SMART-BUILDING CONTROL DEVICE, TO CONTROL ENVIRONMENTAL DEVICES AT THE SMART BUILDING TO ASSIST THE FIRST RESPONDER WITH RESPECT TO THE CONTEXT

(58) Field of Classification Search
CPC ......... H04W 4/80; H04W 4/00; H04M 11/04;
G08B 27/00; G08B 29/18; G08B 13/22;
G08B 13/00; G08B 29/04; G08B 31/00;
G08B 25/00; G08B 25/14; G08B 13/19;
G08B 15/00; G08B 19/00; G08B 21/00;
G08B 15/02; G08B 23/00
USPC .......................................................... 370/259
See application file for complete search history.

(56) References Cited

U.S. PATENT DOCUMENTS

| | | | |
|---|---|---|---|
| 8,116,327 B2 | 2/2012 | Schuette et al. | |
| 8,417,533 B2* | 4/2013 | Clawson | G06Q 10/04 |
| | | | 705/1.1 |
| 8,908,837 B2* | 12/2014 | O'Conor | H04M 11/04 |
| | | | 455/404.1 |
| 9,208,676 B2* | 12/2015 | Fadell | G06N 5/04 |
| 9,226,124 B2 | 12/2015 | Schuler et al. | |
| 9,288,371 B2 | 3/2016 | Ganesh et al. | |
| 9,520,250 B2 | 12/2016 | O'Keeffe | |
| 9,615,226 B2 | 4/2017 | Petite | |
| 9,924,579 B2 | 3/2018 | Tran | |
| 10,299,101 B1* | 5/2019 | Lim | G08B 25/005 |
| 10,332,059 B2* | 6/2019 | Matsuoka | G08B 25/008 |
| 10,674,587 B2* | 6/2020 | Sinitsyn | H04N 23/74 |
| 10,867,460 B1 | 12/2020 | Miller | |
| 11,076,277 B2 | 7/2021 | Tjandra et al. | |
| 11,188,034 B2* | 11/2021 | Theis | G05B 9/02 |
| 11,595,226 B1* | 2/2023 | Bier | G05B 15/02 |
| 11,823,674 B2* | 11/2023 | Furman | H04L 67/306 |
| 12,020,555 B2* | 6/2024 | Gustof | G08B 21/0453 |
| 2010/0088970 A1 | 4/2010 | Miller | |
| 2010/0106306 A1 | 4/2010 | Simon et al. | |
| 2011/0245938 A1 | 10/2011 | Picco | |
| 2013/0109406 A1 | 5/2013 | Meador et al. | |
| 2013/0156299 A1 | 6/2013 | Zhang et al. | |
| 2019/0246477 A1 | 8/2019 | Sinitsyn et al. | |
| 2019/0368758 A1* | 12/2019 | Aller | F24F 11/56 |
| 2020/0118403 A1* | 4/2020 | Poy | H04W 4/90 |
| 2020/0213831 A1 | 7/2020 | Tjandra et al. | |
| 2023/0034481 A1* | 2/2023 | Benton | G08B 17/10 |

FOREIGN PATENT DOCUMENTS

| | | |
|---|---|---|
| CN | 10627894 A | 6/2016 |
| DE | 10029784 A1 | 11/2001 |
| KR | 101818314 B1 | 1/2018 |
| WO | 2018160961 A1 | 9/2018 |
| WO | 2020117073 A1 | 6/2020 |

OTHER PUBLICATIONS

Microsoft City Next: empowering smarter cities—Microsoft Industry Blogs, Published Sep. 27, 2016; https://cloudblogs.microsoft.com/industry-blog/government/2016/09/27/c.

Ivanov, Alexander, et al.: "Recognition and Identification of the Clothes in the Photo or Video using Neural Networks", (2018), 1513-1516. 10.1109/EIConRus.2018.8317385, published Jan. 29, 2018.

* cited by examiner

DEVICE, SYSTEM AND METHOD FOR CONTROLLING ENVIRONMENTAL DEVICES AT A SMART BUILDING TO ASSIST A FIRST RESPONDER

BACKGROUND OF THE INVENTION

First responders, dispatched to an incident at a smart building, are generally assigned tasks to perform (e.g. track somebody, collect evidence). Furthermore, they may be equipped with devices (e.g. body worn cameras, mobile devices, and the like), which collect data and/or evidence (e.g. photo, audio, video). First responders may have problems moving in the building and/or the quality of the data collected may be poor, for example due to environmental conditions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
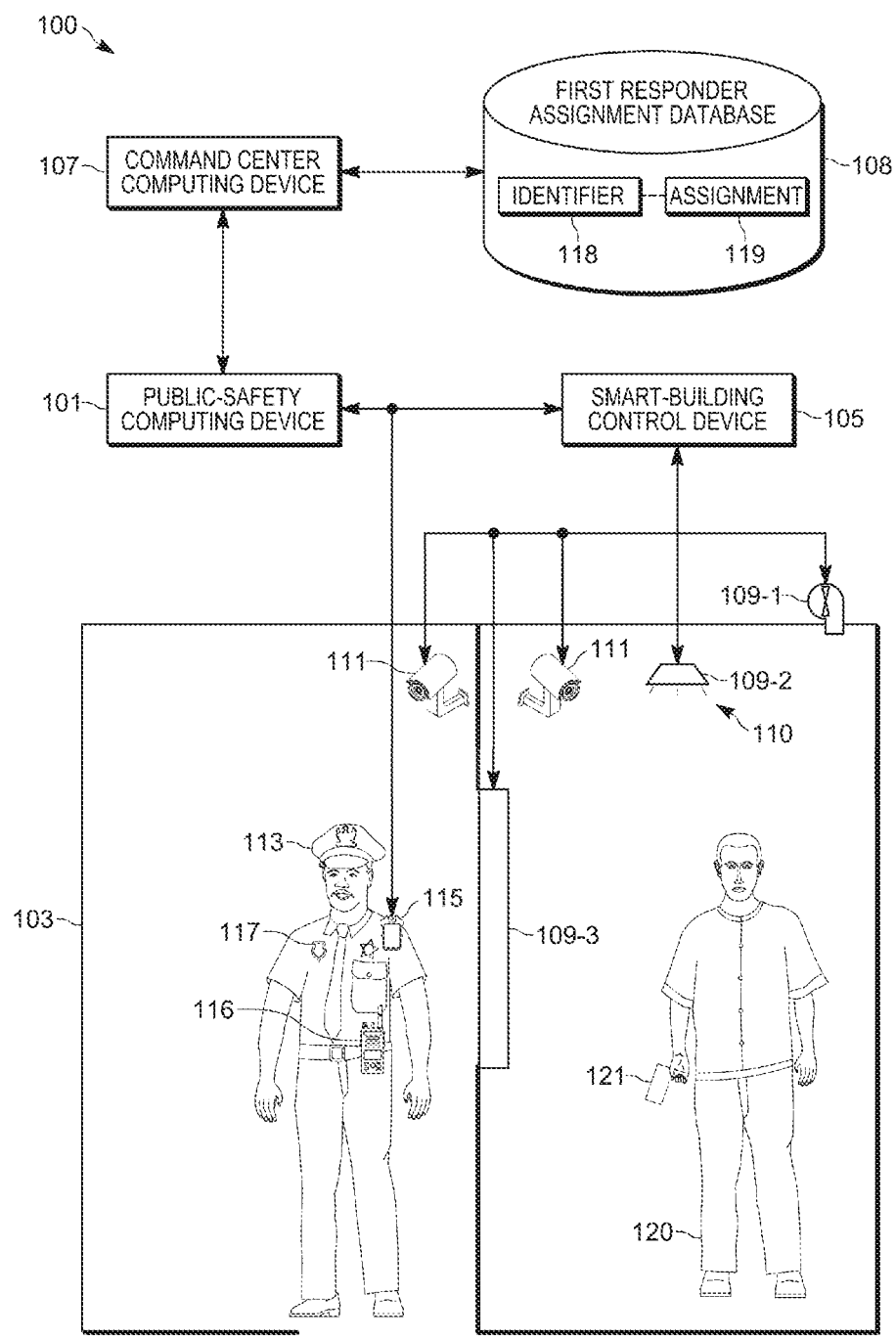
FIG. 1 is a system for controlling environmental devices at a smart building to assist a first responder, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

First responders, dispatched to an incident (e.g. a public-safety incident) at a smart building, are generally assigned tasks to perform (e.g. track somebody, collect evidence). Furthermore, they may be equipped with devices (e.g. body worn cameras, mobile devices, and the like), which collect data and/or evidence (e.g. photo, audio, video). First responders may have problems moving in the building and/or the quality of the data collected may be poor, for example due to environmental conditions. In some examples, doors may be locked and/or areas of the smart building may be too dark to move safely and/or areas may be too bright and reveal the position of the first responder. In other examples, areas may be too dark to gather good quality images and/or video, and/or areas may be too noisy to gather good quality audio. However, environmental devices of the smart building may be controlled, as described herein, to assist the first responder with moving through the building and/or collecting data and/or evidence, based on a context of the first responder. Such context may include, but is not limited to: objectives and/or tasks assigned to the first responder, to respond to the public-safety incident; and objects-of-interest, which are to be identified and/or for which evidence is to be collected. However, any suitable context is within the scope of the present specification. In some examples, a public-safety computing device may communicate with a smart-building control device, which controls the environmental devices, to implement a method for controlling the environmental devices at the smart building to assist a first responder. For example, the public-safety computing device and the smart-building control device may be placed in a master/slave relationship, and the public-safety computing device may communicate with the smart-building control device to control the environmental devices to increase or decrease light and/or sound in areas of the smart building to assist the first responder with moving through the smart building and/or collecting evidence at the smart building. In particular examples, one or more of the environmental devices may comprise a heating, ventilation, and air conditioning (HVAC) device and the HVAC device may be controlled to assist a first responder with respect to a context of the first responder, for example to reduce noise and/or clear smoke from a room of a smart building.

An aspect of the specification provides a method comprising: determining, at a public-safety computing device, a context of a first responder at a smart building, the public-safety computing device in communication with a smart-building control device, the context comprising one or more of: an objective to be achieved by the first responder in the smart building; and an object-of-interest in the smart building for which evidence is to be collected; and communicating, at the public-safety computing device, with the smart-building control device, to control environmental devices at the smart building to assist the first responder with respect to the context.

Another aspect of the specification provides a public-safety computing device comprising: a communication unit configured to communicate with a smart-building control device; and a controller configured to: determine a context of a first responder at a smart building, the context comprising one or more of: an objective to be achieved by the first responder in the smart building; and an object-of-interest in the smart building for which evidence is to be collected; and communicate, via the communication unit, with the smart-building control device, to control environmental devices at the smart building to assist the first responder with respect to the context.

Attention is directed to FIG. 1, which depicts an example system 100 for controlling environmental devices at a smart building to assist a first responder. The system 100 comprises a public safety computing device 101, a smart building 103, a smart-building control device 105 (e.g. for controlling the smart building 103), a command center computing device 107 and a first responder assignment database 108. The various devices and/or components of the system 100 are in communication via any suitable number of communication links (e.g. depicted as a double-ended arrow between devices and/or components of the system 100), and the communication links may comprise any suitable number of wired and/or wireless communication links, any suitable number of wired and/or wired communication networks, and the like.

The public safety computing device 101 is interchangeably referred to hereafter as the computing device 101, and the smart-building control device 105 is interchangeably referred to hereafter as the control device 105. In some examples, the devices 101, 105 may be combined into one device and/or co-located with each other. In other examples, the devices 101, 107 may be combined and/or co-located with each other. In yet further examples, the devices 101, 105, 107 may be combined and/or co-located with each other. The devices 101, 105, 107 are described in more detail below.

While the smart building 103 is schematically depicted as a given number of a plurality of rooms (e.g. two rooms) on one floor, the smart building 103 may include more or less than the depicted number of rooms, and/or more than one floor.

Furthermore, the system 100 comprises a plurality of environmental devices 109-1, 109-2, 109-3 deployed at the smart building 103, the environmental devices 109-1, 109-2, 109-3 in communication with the smart-building control device 105. The environmental devices 109-1, 109-2, 109-3 are interchangeably referred to hereafter, collectively, as the environmental devices 109 and, generically, as an environmental device 109. While three environmental devices 109 are depicted, the system 100 may comprise more than three environmental devices 109 or fewer than three environmental devices 109. While the environmental devices 109 are depicted in only one room of smart building 103, the environmental devices 109 may be located at any suitable locations at the smart building 103 and/or one or more of the environmental devices 109 may be external and/or at least partially external to the smart building 103 (e.g. as depicted, the environmental device 109-1).

As depicted, the control device 105 is in communication with the environmental devices 109, and the control device 105 is generally configured to control the environmental devices 109, for example to control an environment of the smart building 103. In general, during "normal" and/or default functioning of the smart building 103, the control device 105 may dynamically control the environmental devices 109 to achieve given environmental conditions at the smart building 103, and/or to achieve given and/or local environmental conditions at areas and/or rooms of the smart building 103. Such environmental conditions may include, but are not limited to, access (e.g. doors being closed, or open, and/or doors being locked or unlocked), sound (e.g. noise), light, temperature, and the like, and/or any other suitable environmental condition. The smart building 103 may be referred to as "smart" due to the presence of the control device 105 and the environmental devices 109, which may be centrally and/or dynamically controlled by the control device 105. In some examples, as depicted, cameras 111 may be deployed at the smart building 103 to detect given users of the smart building 103, and the environmental conditions of a given area and/or room, which the given user is entering, may be responsively controlled to achieve predetermined environmental conditions preferred by the given user (e.g. as stored at the control device 105 and/or at a database accessible to the control device 105). However, the environmental conditions of the smart building 103 may be controlled in any suitable manner.

Furthermore, while only two cameras 111 are depicted at the smart building 103, any suitable number of cameras 111 may be located at the smart building 103 (e.g. inside and/or outside the smart building 103). However, the cameras 111 may be optional.

While only cameras 111 are depicted at the smart building 103, other types of sensors may be deployed at the smart building 103 including, but not limited to, smoke detectors, temperature detectors, gas detectors, motion detectors, microphones, and the like. Such sensors may be in communication with the smart-building control device 105 and/or the computing device 101 (e.g. via the smart-building control device 105). In particular, smoke detectors may be used to detect smoke at the smart building 103 and/or smoke detectors may be used to detect smoke in particular areas and/or rooms of the smart building 103. Alternatively video data and/or images from the cameras 111 may be used to detect smoke at the smart building 103 and/or in particular areas and/or rooms of the smart building 103.

As depicted, the environmental device 109-1 comprises a fan and/or a blower, and the like, which may, for example, be a component of an HVAC system; the fan of the environmental device 109-1 may, for example, may convey hot and/or cold air from the HVAC system into one or more rooms of the smart building 103 to control temperature of the smart building 103 and/or rooms and/or areas of the smart building 103. Hence, while the environmental device 109-1 is depicted as a standalone component, the environmental device 109-1 may be connected to heating and/or cooling elements of the HVAC system. Furthermore, the fan of the environmental device 109-1 may be a sound-making device, which may cause sound to occur in the smart building 103. The control device 105 may hence control the environmental device 109-1 to control temperature and/or sound in the smart building 103 and/or rooms and/or areas of the smart building 103. In some examples, the fan of the environmental device 109-1 may be used to withdraw smoke from an area and/or a room of the smart building 103 (e.g. by reversing a direction of the fan, which may, in a default mode, be used to convey hot air and/or cold air into the room). As described above, smoke may be detected at the smart building via smoke detectors and/or the cameras 111. In yet further examples, the fan of the environmental device 109-1, and the like, may be used to prevent and/or control air circulation to and/or from a defined space (e.g. rooms and/or areas) of the smart building 103, for example for one or more of: evidence preservation; and hazard containment purposes. For example, a fire and/or toxic gases in a room of the smart building 103 may be controlled, whether smoke is detected or not, by preventing air circulation in the room (e.g. by turning off and/or slowing and/or reversing the fan of the environmental device 109-1). Such fire control may also assist with evidence preservation to prevent, for example, fire from destroying and/or harming evidence. Fire may be detected via temperature detectors and/or the cameras 111, and toxic gas may be detected via gas detectors and/or the cameras 111.

As depicted, the environmental device 109-2 comprise a lighting device (e.g. a light, a ceiling light and/or any other suitable lighting device). In some examples, the lighting device of the environmental device 109-2 may be controlled, by the control device 105, between an on-state and an off-state, and/or the lighting device of the environmental device 109-2 may be controlled, by the control device 105 to one or more lighting levels (e.g. dimming levels) between an on-state and an off-state. In yet further examples, other lighting parameters of the lighting device of the environmental device 109-2 may be controlled, by the control device 105, including, but limited to, color, hue, color temperature, and the like. The control device 105 may hence control the environmental device 109-2 to control lighting in the smart building 103 and/or rooms and/or areas of the smart building 103. As depicted, the lighting device of the environmental device 109-2 is emitting light 110.

As depicted, the environmental device 109-3 comprises an access-control device such as a door, a door lock, a movable wall, and the like. In some examples, the access-control device of the environmental device 109-3 may be controlled, by the control device 105, between a closed state and an open state, and/or the access-control device of the environmental device 109-3 may be controlled, by the control device 105 between a locked state and an unlocked state. The control device 105 may hence control the environmental device 109-3 to provide access (e.g. to one or more rooms and/or areas) in the smart building 103.

While the environmental devices 109 are depicted as specific types of devices, the environmental devices 109 may comprise any suitable environmental devices for controlling an environment and/or environmental conditions of the smart building 103 including, but not limited to, local environments and/or environments of specific areas and/or rooms of the smart building 103. The environmental devices 109 may include, but are not limited to, one or more of: a lighting device; a light; a sound-making device; an HVAC device; a speaker (e.g. which may emit sound and/or noise); an access-control device; a door lock; an elevator; one or more movable walls (e.g. which may increase or decrease size of areas and/or rooms, and/or control access to areas and/or rooms; one or more blinds (e.g. at windows, and the like, of the smart building 103).

An environmental device 109 may be for controlling more than one environmental condition of the smart building 103. For example, as described above, a fan may comprise both a temperature-control device, a smoke-control device and a noise-control device. Similarly, an elevator may comprise both an access-control device (e.g. for controlling access between floors) and a sound-control device (e.g. as a moving elevator may make noise). Similarly, a movable wall may comprise both an access-control device (e.g. for controlling access to an areas and/or room) and a light-control device (e.g. by controlling light between areas and/or rooms).

In the depicted example, a public-safety incident may be occurring at the smart building 103, which has resulted in a first responder 113 being dispatched to the smart building 103. As depicted, the first responder 113 comprises a police officer, though any suitable first responder is within the scope of the present specification including, but not limited to, police, fire fighters, emergency medical technicians, and the like. Furthermore, more than one first responder and/or more than one type of first responder may be dispatched to the public-safety incident at the smart building 103.

As depicted, the first responder 113 is carrying a device 115 and specifically a body worn camera (BWC) configured to collect data including, but not limited to, video and/or images and/or audio, for example as the first responder 113 responds to the public-safety incident. However, any suitable type of device and/or any suitable type of data for collection is within the scope of the present specification. The first responder 113 may carry more than one device and/or more than one type of device; for example, as depicted, the first responder 113 is also carrying a mobile radio device 116 (and/or any other suitable communication device) that may communicate with the device 115 in a personal area network (PAN). While the device 115 is depicted in FIG. 1 as being communication with the computing device 101, in other examples the device 115 may be communication with the computing device 101 via the mobile radio device 116 (e.g. via the PAN).

As depicted, the first responder 113 wears a badge 117 that may be used to identify the first responder 113 (e.g. generically, as a member of a given public-safety entity and/or, more specifically, as a particular first responder via a badge number and/or an identifier (not depicted) printed on the badge 117). Such identification may be used to provide the first responder 113 with access to the smart building 103 and/or such identification may be used to provide the first responder 113 with access to networks of the smart building 103 (e.g. which may include the control device 105), among other possibilities.

As depicted, the database 108 stores an identifier 118 of the first responder 113, which may include the badge number and/or identifier on the badge 117. As depicted, the identifier 118 is stored at the database 108 in association with an assignment 119 (e.g. assignment data and/or context data), which may define a context of the first responder 113. For example the assignment 119 may include data indicative of the objective of the first responder 113 at the smart building 103. For example, the assignment 119 may include an identifier and/or image of a suspect 120 being tracked at the smart building 103 in association with the public-safety incident at the smart building 103, and/or the assignment 119 may include an indication of an object 121 (e.g. an object-of interest) at the smart building 103. In particular, as depicted, the suspect 120 may have been reported holding the object 121, which may not be initially identified (e.g. the object 121 may be a mobile phone, a weapon and/or any other object and/or hand-held object), and the assignment 119 may indicate that the first responder 113 is to track the suspect 120 and identify the object 121. While present examples are described with respect to an object-of-interest being the object 121 carried by the suspect 120, in other examples, the assignment 119, and the like, may indicate that the first responder 113 is to collect evidence of any suitable object-of-interest in the smart building 103; such objects-of-interest may be carried by suspects and/or other occupants of the smart building 103, and/or such objects-of-interest may be in fixed and/or given locations in the smart building 103 (e.g. such objects-of-interest may not be carried by an occupant of the smart building 103 and/or may not be mobile).

In some examples, the command center computing device 107 may comprise a dispatch computing device, and the like, which is configured to communicate with one or more devices 115 carried by the first responder 113 to transmit messages thereto to dispatch the first responder 113 to the smart building 103. The first responder 113 may be associated with a public-safety incident at the smart building 103, for example by being dispatched to the public-safety incident and/or via the assignment 119.

The assignment 119 may be transmitted to the mobile radio device 116. While a communication link is not depicted between the command center computing device 107 and the mobile radio device 116, a communication link (e.g. a wireless communication link) may nonetheless be established therebetween. Alternatively, as depicted, the devices 115, 116 carried by the responder may be in communication with the command center computing device 107, and the devices 115, 116 carried by the responder may communicate with the computing device 101 via the command center computing device 107.

In some examples, the command center computing device 107 may be further configured to provide a context of the first responder 113 to the computing device 101, for example in the form of the assignment 119 (and/or any other suitable context data), which may be retrieved from the database 108 via the command center computing device 107. Such context and/or context data may comprise one or more of: an objective to be achieved by the first responder 113 in the smart building 103; and an object-of-interest in the smart building 103 for which evidence is to be collected.

For example, as depicted, and as previously described, the suspect 120 (e.g. for a crime) may be located in the smart building 103, and the suspect 120 may have been reported as carrying the object 121. Hence, the context of the first responder 113 may be to, one or more of: an objective to track and/or find the suspect 120; and identify the object 121 and/or collect evidence about the object 121 (e.g. the object 121 may comprise an object-of-interest). As such, an objective and/or object-of-interest may be associated with a public-safety incident at the smart building 103.

Alternatively, the context of the first responder 113 may be an objective to collect evidence associated with the suspect 120 and/or object 121 (e.g. to identify the object 121), for example using the device 115. However, the context of the first responder 113 may include any suitable objective and/or task and/or context data and/or object.

While the above described contexts and object-of-interest are described with respect to the first responder 113 being a police officer, contexts for other types of first responders are within the scope of the present specification. For example, a context for a fire fighter may comprise an objective to extinguish a fire in a particular room of the smart building 103 and/or to rescue a given person and/or object from a fire in the smart building 103; and an object-of-interest, for which evidence is to be collected, may comprise a person and/or an object that is to be found and/or retrieved and/or rescued from the smart building 103, by the firefighter. Similarly, a context for an emergency medical technicians may comprise an objective to provide medical assistant to a given person in the smart building 103. However, any suitable context for any type of first responder is within the scope of the present specification.

As will be described hereafter, hereafter, the computing device 101 is generally configured to determine a context of the first responder 113, and communicate with the control device 105 to control the environmental devices 109 at the smart building 103 to assist the first responder 113 with respect to the context.

Furthermore, in some examples, one or more of the environmental device 109 and the cameras 111 may comprise an internet-of-things (IoT) device. Such IoT devices may be used to grant the first responder 113 access to one or more of a network of the smart building 103 and devices of the smart building 103. For example, as described below, access to one or more of a network of the smart building 103 and devices of the smart building 103 may be granted to the first responder 113 based on data received from an IoT device of the smart building 103.

In particular, as depicted in FIG. 1, the first responder 113 is depicted as being in the smart building 103 and hence may already have been granted access thereto, for example upon a camera 111, and the like, detecting the first responder 113 at an entrance to the smart building 103. For example, while no cameras 111 are depicted as external to the smart building 103 and/or at an entrance to the smart building 103, one or more cameras 111 may include entrance to the smart building 103 in a respective field-of-view, and video data and/or images of the first responder 113 at the entrance to the smart building 103 may be used to grant access of the first responder 113 to the smart building 103.

Figure 2:
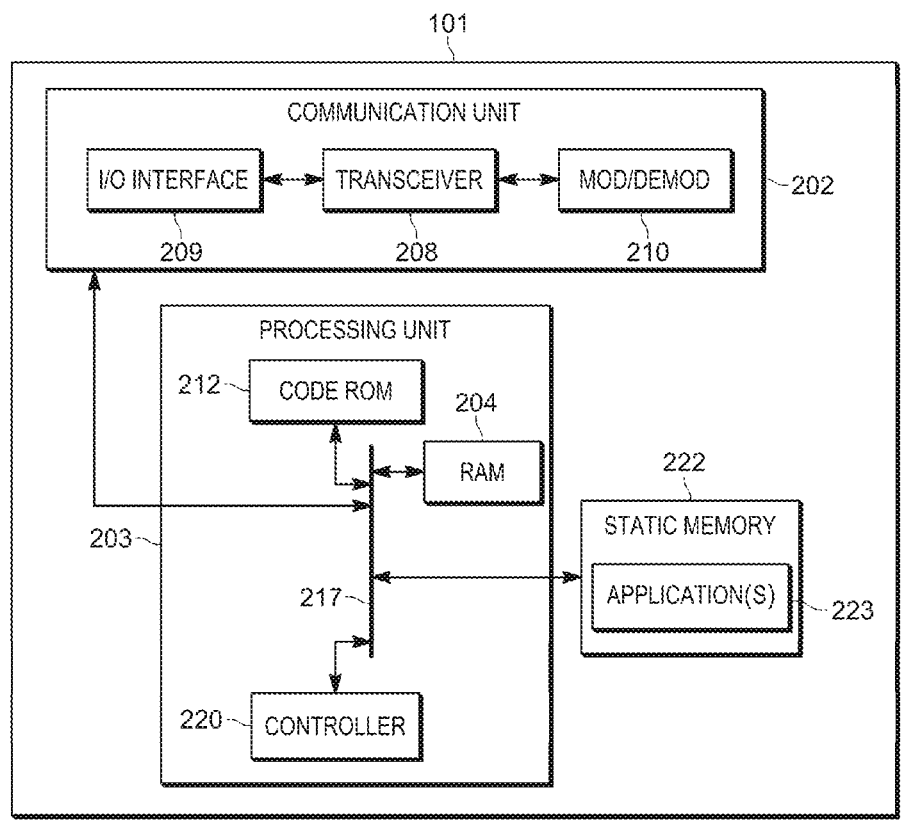
FIG. 2 is a device diagram showing a device structure of a computing device for controlling environmental devices at a smart building to assist a first responder, in accordance with some examples.

Attention is next directed to FIG. 2, which depicts a schematic block diagram of an example of the computing device 101. In general, the computing device 101 may comprise one or more servers and/or one or more cloud computing devices, and the like, configured to communicate with the control device 105 and, optionally, the command center computing device 107 and the devices 115, 116. However, the computing device 101 may comprise a computing device such as a personal computer and/or a laptop computer, and the like. In some examples, the computing device 101 may be combined with command center computing device 107. The computing device 101 may be located at a public-safety access point (PSAP), and the like, and/or remote from a PSAP, and the like. Similarly, the computing device 101 may be located at a same facility (e.g. a PSAP) as the command center computing device 107, and the like, and/or the computing device 101 and the command center computing device 107 may be remote from each other; the command center computing device 107 may be remote from a PSAP, and the like. Alternatively, in other examples, the computing device 101 may be co-located with the control device 105, for example at the smart building 103; and/or the computing device 101 and the control device 105 may be remote from each other and/or remote from the smart building 103.

As depicted, the computing device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the computing device 101 may include one or more of an input device and a display screen and the like, a microphone (e.g. to receive voice commands) such that a user may interact with the computing device 101. However, a user may interact with the computing device 101 via the command center computing device 107 and/or the control device 105, which may include respective input devices (not depicted), and/or a user may interact with the computing device 101 via one or more of the devices 115, 116.

As shown in FIG. 2, the computing device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209, which are configurable to communicate with the control device 105 and, optionally, the command center computing device 107 and/or one or more of the devices 115, 116. For example, the communication unit 202 may include one or more transceivers 208 and/or wireless transceivers for communicating with the control device 105 and, optionally, the command center computing device 107 and/or one or more of the devices 115, 116. Hence, the one or more transceivers 208 may be adapted for communication with one or more communication networks and/or communication links used to communicate with the control device 105 and, optionally, the command center computing device 107 and/or one or more of the devices 115, 116. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for controlling environmental devices at a smart building to assist a first responder. For example, in some examples, the computing device 101 and/or the controller 220 specifically comprises a computer executable engine configured to implement functionality for controlling environmental devices at a smart building to assist a first responder.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 101 as described herein are maintained, persistently, at the memory 222 and used by the controller 220, which makes appropriate utilization of volatile storage during the execution of such programming instructions.

Figure 3:
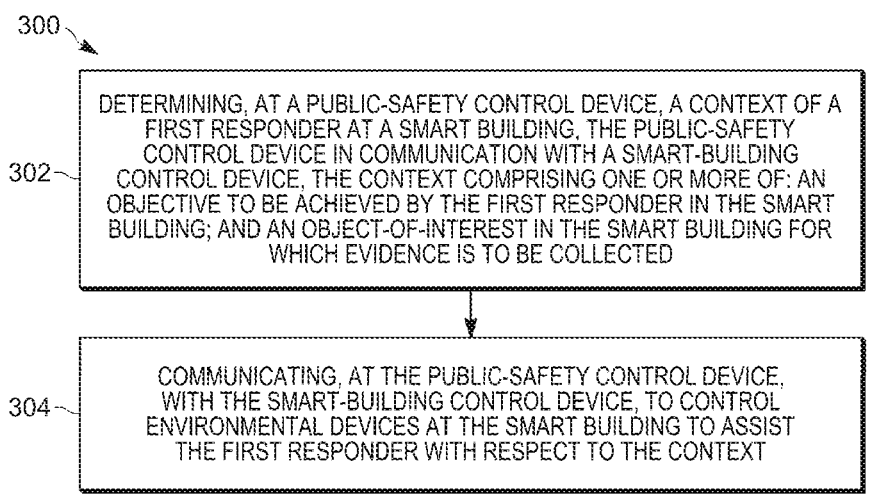
FIG. 3 is a flowchart of a method for controlling environmental devices at a smart building to assist a first responder, in accordance with some examples.

In particular, the memory 222 stores instructions corresponding to the at least one application 223 that, when executed by the controller 220, enables the controller 220 to implement functionality for described herein including, but not limited to, the blocks of the method set forth in FIG. 3.

In illustrated examples, when the controller 220 executes the one or more applications 223, the controller 220 is enabled to: determine a context of a first responder at a smart building, the context comprising one or more of: an objective to be achieved by the first responder in the smart building; and an object-of-interest in the smart building for which evidence is to be collected; and communicate with a smart-building control device, to control environmental devices at the smart building to assist the first responder with respect to the context.

The application 223 may include numerical algorithms configured to control environmental devices at a smart building to assist a first responder with respect to a context.

Alternatively, and/or in addition to the numerical algorithms, the application 223 may include machine learning models and/or algorithms, and the like, which have been trained to control environmental devices at a smart building to assist a first responder with respect to a context.

Furthermore, in these examples, the application 223 may initially be operated by the controller 220 in a training mode to train the machine learning models and/or algorithms of the application 223 to perform the above described functionality. In examples where the application 223 includes one or more machine learning algorithms, training mode may generate classifiers, and the like, used by the one or more machine learning algorithms to control environmental devices at a smart building to assist a first responder with respect to a context.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments, such as a PSAP. Any suitable machine learning algorithm and/or deep learning algorithm and/or neural network is within the scope of present examples.

While details of the devices 105, 107, 115, 116 are not depicted, the devices 105, 107, 115, 116 and the command center computing device 107 may have components same and/or similar to the computing device 101 adapted, however, for the respective functionality of the devices 105, 107, 115, 116 as described herein. For example, the device 115 may comprise a BWC and include any suitable combination of cameras and/or microphones. Similarly, the mobile radio device 116 comprises a radio.

In some examples, one or more of the devices 115, 116 may comprise a location-determining device including, but not limited to, a Global Positioning System (GPS) device, and the like, which determines a location of the devices 115, 116 and hence the first responder 113; when a device 115, 116 includes a location-determining device, location data (e.g. GPS data) may transmitted and/or periodically transmitted to the computing device 101 such that to the computing device 101 may determine a location of the first responder 113. However, the device 115 may include components for transmitting a stream-of-data (e.g. video data) to the computing device 101, which may determine a location of the location of the first responder 113 from the stream-of-data (e.g. images in video data may be compared to images of the smart building 103 to which the computing device 101 has access (e.g. at a database, not depicted).

Attention is now directed to FIG. 3, which depicts a flowchart representative of a method 300 for controlling environmental devices at a smart building to assist a first responder. The operations of the method 300 of FIG. 3 correspond to machine readable instructions that are executed by the computing device 101, and specifically the controller 220 of the computing device 101. In the illustrated example, the instructions represented by the blocks of FIG. 3 are stored at the memory 222 for example, as the application 223. The method 300 of FIG. 3 is one way in which the controller 220 and/or the computing device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the computing device 101 determines a context of the first responder 113 at the smart building 103. As described above, the context generally comprises one or more of: an objective to be achieved by the first responder 113 in the smart building 103; and an object-of-interest in the smart building 103 for which evidence is to be collected. The context may be provided in any suitable format and/or as any suitable data and/or context data.

Furthermore, the controller 220 and/or the computing device 101 may determine the context at any suitable time. For example, controller 220 and/or the computing device 101 may determine the context upon one or more of: dispatch of the first responder 113 to a public-safety incident associated with the smart building 103 (e.g., by a dispatcher operating the command center computing device 107); arrival by the first responder at the smart building 103; and entry by the first responder to the smart building 103. Arrival and/or entry by the first responder at the smart building 103 may be determined via video data and/or images received from the cameras 111, and/or location data (e.g. GPS data and/or images indicating location) received from one or more of the devices 115, 116 and/or any other suitable device carried by the first responder 113. Alternatively, arrival and/or entry by the first responder at the smart building 103 may be self-reported by the first responder 113, via the mobile radio device 116 carried by the first responder 113 (e.g. the first responder 113 may call-in their location and/or the first responder 113 may message their location), to one or more of the devices 101, 107.

However, determining the context may occur at any suitable time and/or times. For example, the controller 220 and/or the computing device 101 may determine the context when the first responder 113 is dispatched to the smart building 103 and redetermine the context upon arrival by the first responder 113 at the smart building 103. In particular, the context of the first responder 113 may change with time and/or as new information about the public-safety incident is received and/or determined; for example, the context may initially comprise an objective to track the suspect 120, and the context may be updated to include data indicating that the suspect 120 is carrying the object 121, which is to be identified (e.g. evidence for the object 121 is to be collected).

Furthermore, determining, at the controller 220 and/or the computing device 101, the context of the first responder 113 at the smart building 103 may comprise one or more of: receiving context data from a first responder communication device as carried by the first responder 113; receiving the context data from the command center computing device 107; receiving video data from cameras 111 deployed in the smart building 103; determining an identity of the first responder 113 from one or more of: the video data from the cameras 111 deployed in the smart building 103 and communication with the command center computing device 107, and the like.

For example, as described above, the context of the first responder 113 at the smart building 103 may comprise tracking the suspect 120 and/or identifying the object 121 carried by the suspect 120 and/or collecting evidence about the object 121. Continuing with this example, the context of the first responder 113 may be determined via context data received from a first responder communication device as carried by the first responder 113; for example, the first responder 113 may operate the mobile radio device 116 (e.g. which may include interacting with an incident reporting application at the mobile radio device 116) to report that the suspect 120 and/or the object 121 has been spotted by the first responder 113 and that the first responder 113 is pursuing the suspect 120. The context data may include an image of the suspect 120, for example as captured by the device 115, which may be communicated to the computing device 101 accordingly, such that the cameras 111 may be used to search for the suspect 120 at the smart building 103 to inform the first responder 113 (e.g. via the mobile radio device 116) of where to search for the suspect 120 at the smart building 103.

Similarly, the context of the first responder 113 may be determined via context data received from the command center computing device 107. For example, a caller may call the command center computing device 107 and/or a PSAP to report the suspect 120, along with a description thereof and/or a name of the suspect 120. The description thereof and/or name of the suspect 120 may be used to dispatch the first responder 113 to the smart building to search for and/or track the suspect 120 (and/or the object 121); the assignment 119 may be generated and stored at the database 108, in association with the identifier 118, in response to dispatching the first responder 113 to the smart building. The description of the suspect 120 and/or name of the suspect 120 may alternatively be used to generate and/or retrieve (e.g. from a database of suspects, not depicted) an image of the suspect 120 such that the cameras 111 may be used to search for the suspect 120 at the smart building 103 to inform the first responder 113 (e.g. via the mobile radio device 116) of where to search for the suspect 120 at the smart building 103.

In further examples, the context of the first responder 113 may be determined via receiving video data from the cameras 111 deployed in the smart building 103. For example, video data from the cameras 111 may be streamed from the control device 105 to the computing device 101 (and/or the command center computing device 107), and one or more of the device 101, 107 may use the images of the video data to search a database of suspects (not depicted), which may cause the suspect 120 to be identified (e.g. as the subject of an arrest warrant) and which may cause the first responder 113 to be dispatched to the smart building 103. Similar to as described above, the assignment 119 may be generated and stored at the database 108, in association with the identifier 118, in response to dispatching the first responder 113 to the smart building 103.

Furthermore, the context of the responder may be determined by: determining an identity of the first responder 113 from one or more of: the video data from the cameras 111 deployed in the smart building 103; and communication with the command center computing device 107. For example, the video data from the cameras 111 may be used by the computing device 101 to determine that the first responder 113 is located at the smart building 103. In some of these examples, the identifier 118 may be shown on the badge 117, which may be in images of the video data, and the identifier 118 of the first responder 113 may be extracted from the video data. In other examples, an image of the first responder 113 in the video data may be used to identify the first responder 113 (e.g. using any suitable facial recognition software, and the like), which may include using the image to determine the identifier 118 (e.g. as retrieved from an employee database) and which may, in turn, be used to retrieve the assignment 119. Regardless, when the first responder 113 is identified, the assignment 119 associated with the first responder 113 (e.g. context of the first responder 113) may be retrieved, for example by communicating with the command center computing device 107, which may retrieve the assignment 119 from the database 108; as described above, the assignment 119 may generally indicate the context of the first responder.

At a block 304, the controller 220 and/or the computing device 101 communicates with the smart-building control device 105 (e.g. via the communication unit 202), to control environmental devices 109 at the smart building 103 to assist the first responder 113 with respect to the context.

Such controlling of the environmental devices 109 may occur to assist the first responder 113 with one or more of collecting data via the device 115, moving through the smart building 103 (e.g. stealthily moving through the smart building 103), tracking the suspect 120, identifying object 121, collecting evidence about the object 121 and the like.

In particular, communicating with the smart-building control device 105, to control the environmental devices 109 to assist the first responder 113 with respect to the context, may comprise one or more of: controlling a lighting device (e.g. the environmental device 109-2) to increase light emitted; controlling a lighting device (e.g. the environmental device 109-2) to decrease the light emitted; controlling a sound-making device (e.g. the environmental device 109-1) to increase sound emitted; controlling a sound-making device (e.g. the environmental device 109-1) to decrease the sound emitted; controlling an access-control device (e.g. the environmental device 109-3) to permit access by the first responder 113; controlling an access-control device (e.g. the environmental device 109-1) to deny access to a suspect (e.g. the suspect 120) being tracked by the first responder 113; controlling an HVAC device to one or more of: increase or decrease respective sound emitted; decrease smoke; prevent and/or control air circulation to and/or from a defined space (e.g. rooms and/or areas) of the smart building 103; moving one or more movable walls; opening one or more blinds (e.g. to increase light); and closing one or more blinds (to decrease light). Examples of controlling the environmental devices 109 are described below.

In other examples, the controller 220 and/or the computing device 101 may be further configured to track a location of the first responder 113 in the smart building 103. For example, similar to as described above, a location of the first responder 113 in the smart building 103 may be determined via video data and/or images received from the cameras 111, and/or location data (e.g. GPS data and/or images indicating location) received from the device 115 and/or the mobile radio device 116 and/or any other suitable device carried by the first responder 113. In such examples, the controller 220 and/or the computing device 101 may be further configured to communicate with the smart-building control device 105, to control one or more of the environmental devices 109 to assist the first responder 113 with respect to the context by: controlling the environmental devices 109 with respect to the location of the first responder 113 in the smart building 103.

Examples of controlling the environmental devices 109 are next described, with more detailed examples of controlling the environmental devices 109 described below with respect to FIG. 5, FIG. 6 and FIG. 7.

In some examples, assisting the first responder 113, with respect to the context, may comprise: controlling an access-control device (e.g. the environmental device 109-3), along a path to the suspect 120, to open and/or unlock such that the first responder 113 may proceed to track the suspect 120. For example, with brief reference to FIG. 1, the controller 220 and/or the computing device 101 may determine a location of the first responder 113 (e.g. as described above) and cause access-control devices (e.g. doors and/or movable walls) to open and/or unlock, when the first responder 113 is proximal the access-control devices. Alternatively, when the controller 220 and/or the computing device 101 has access to respective locations of the first responder 113 and the suspect 120, the controller 220 and/or the computing device 101 may determine a path therebetween and open and/or unlock access-control devices along the path.

In other examples, assisting the first responder 113, with respect to the context, may comprise: controlling lighting devices at a location of the first responder 113 in the smart building 103 to increase light emitted, for example to light a path to the suspect 120. However, in other examples, assisting the first responder 113, with respect to the context, may comprise: controlling lighting devices at a location of the first responder 113 in the smart building 103 to decrease light emitted, for example to hide and/or obscure a location of the first responder 113. The controller 220 and/or the computing device 101 may operate in different modes to either increase or decrease light along a path of a first responder 113. In some examples, the mode may be selected by the first responder 113, for example via the first responder 113 interacting with the mobile radio device 116 to transmit selection of a mode to the controller 220 and/or the computing device 101. In other examples the mode may be dynamically selected, for example using the aforementioned machine learning algorithms being trained to dynamically select a mode. In a particular example, the first responder 113 may be wearing night vision goggles, which may be determined via images received at the controller 220 and/or the computing device 101 from the cameras 111, and the like, which may cause the controller 220 and/or the computing device 101 to decrease light along a path of a first responder 113 to a lighting level that does not cause flare in the night vision goggles (e.g. such a lighting level may be stored at the memory 222). Alternatively, the device 115 may be equipped with a night-vision system, and the controller 220 and/or the computing device 101 may control light along a path of a first responder 113 to a lighting level that does not cause flare in the night-vision system (e.g. such a lighting level may be stored at the memory 222 as a threshold condition, as described below).

In other examples, controlling the environmental devices 109 to assist the first responder 113, with respect to the context, may comprise: controlling lighting devices at a location of the first responder 113 in the smart building 103 to control any suitable lighting parameter, as described above, including, but not limited to light color, hue, color temperature, and the like. For example, the context of the first responder 113 may be to collect evidence, using a body-worn camera (e.g. the device 115) and lighting devices may be controlled to a light color, hue, color temperature, and the like suitable for evidence capture; indeed, under "normal" and/or default conditions, lighting devices may be controlled to a "soft white" light parameter, while for evidence capture, the lighting devices may be controlled to a "bright white" light parameter and/or to a higher color temperature to assist the first responder 113 to collect evidence, using a body-worn camera.

In other examples, controlling the environmental devices 109 to increase light emitted by a light emitting device, and/or controlling environmental devices 109 to control and/or change a lighting parameter of a light emitting device, and/or controlling the environmental devices 109 to decrease sound and/or noise emitted by a noise-making device, may be implemented to increase a quality of data collected by a first responder device (e.g. the device 115). Put another way, images and/or audio collected by the device 115 may improve when light at the smart building 103 is increased and/or sound at the smart building 103 is decreased. Hence, when the context of the first responder 113 indicates that the first responder 113 is searching for and/or tracking the suspect 120, and/or when the context of the first responder 113 indicates that the first responder 113 is to identify the object 121, the images and/or audio collected by the device 115 may be used to determine when the suspect 120 is found and/or to identify the object 121.

In other examples, controlling the environmental devices 109 to assist the first responder 113, with respect to the context, may comprise controlling an HVAC device to one or more of: increase or decrease respective sound emitted; decrease smoke; prevent air circulation one or more of to and from a defined space of the smart building; and control prevent air circulation one or more of to and from a defined space of the smart building. The control of the HVAC device generally depends on context of the first responder 113, as described above. Hence, when the context of the first responder 113 is to collect evidence which may be improved by decreasing sound, the HVAC device may be turned off, and the like, and/or reversed to clear smoke and/or toxic gas from a room, as described above. When the context of the first responder 113 is to collect and/or preserve evidence and/or contain hazards (such as fire, toxic gas, and the like, for example when the first responder 113 is a fire fighter), the HVAC device may be controlled accordingly for example, to preventing air circulation in a room of the smart building 103 by turning off and/or slowing and/or reversing the HVAC device (e.g. the fan of the environmental device 109-1), as described above.

For example, the device 115 may stream data (e.g. video data and/or audio data) to the computing device 101, which may determine a quality of the streamed data. In some examples, the controller 220 and/or the computing device 101 may determine the quality of the data by processing the data and/or comparing the data to one or more threshold conditions. In some examples, such threshold conditions may include, but are not limited to, a lighting level (e.g. which may be provided in lighting units, as a contrast ratio, and/or in any other suitable manner) in video data and/or images (e.g. from the device 115) that is indicative of objects (e.g. the object 121) being identifiable; such a lighting level may be determined heuristically and stored at the memory 222 (e.g. as component of the application 223) and/or such a lighting level may be determined via feedback to the machine learning algorithms, as described above. As described above, in some examples, such threshold conditions may include, but are not limited to, a lighting level suitable for use with night-vision systems. In other examples, such threshold conditions may include, but are not limited to, a given sound and/or noise level (e.g. a decibel level) in audio data (e.g. from the device 115) that is indicative of sound (e.g. such as a voice of a person) above a given sound and/or noise level being audible. However, any suitable threshold conditions are within the scope of the present specification.

Hence, in some examples, the controller 220 and/or the computing device 101 may be configured to: determine a quality of data collected by a first responder device e.g. the device 115), the data defined with respect to the context; and in response to determining that the quality of the data fails a threshold condition (as described above), communicate with the smart-building control device 105, to control one or more of the environmental devices 109 to one or more of: improve the quality of the data; and improve the quality of the data to meet the threshold condition. The data being defined with respect to the context may indicate, for example, that the object 121 is to be identifiable in the video data and/or that the suspect 120 is be audible in the audio data.

For example, the first responder 113 may enter the room where the suspect 120 is located; in particular, with brief reference to FIG. 1, the controller 220 and/or the computing device 101 may open and/or unlock the access-control device of the environmental device 109-3, and the first responder 113 may pass therethrough into the room where the suspect 120 is located. In this example, video data received from the device 115 may indicate that the room is too dark to identify the object 121 being carried by suspect 120 and/or to collect evidence about the object 121; as such, the controller 220 and/or the computing device 101 may control the environmental device 109-2 to increase a lighting level of the room until the room is bright enough to identify the object 121 and/or collect evidence about the object 121 (e.g. in the video data received from the device 115). In these examples, the controller 220 and/or the computing device 101 communicating with the smart-building control device 105, to control the environmental devices 109 to assist the first responder 113 with respect to the context, may comprise: controlling one or more specific lights of the smart building 103 to adjust a local lighting level to illuminate an object held by a person in the smart building 103, the person defined by the context; for example, as has already been described, an object held by a person in the smart building 103, may comprise the object 121 being held by the suspect 120; similarly, the person being defined by the context may comprise the suspect 120 being defined by the assignment 119.

Similarly, when the first responder 113 enters the room where the suspect 120 is located, audio data received from the device 115 may indicate that the area is too noisy to hear the suspect 120; as such, the controller 220 and/or the computing device 101 may control the environmental device 109-1 to decrease a sound level and/or a noise level of the room; for example, the fan of the environmental device 109-1 may be turned off and/or slowed down.

In some of these examples, the controller 220 and/or the computing device 101 may be further configured to: receive a stream-of-data (e.g. video data and/or audio data) from a first responder device (e.g. the device 115), the stream-of-data defined with respect to the context; and communicate with the smart-building control device 105, in a feedback loop, to control one or more of the environmental devices 109 to improve a quality of the stream-of-data. Hence, for example, the lighting level and/or sound level of the room where the suspect 120 is located may be dynamically adjusted in a feedback loop with a stream-of-data received from the device 115, for example until the one or more threshold conditions, as described above, are met.

Any of the aforementioned examples of the controller 220 and/or the computing device 101 communicating with the smart-building control device 105, to control the environmental devices 109 to assist the first responder 113 with respect to the context, may comprise: overriding one or more functions of the smart-building control device 105. For example, a user, such as the suspect 120, being located in a room of the smart building 103 may "normally" cause the smart-building control device 105 to control the environmental devices 109 to achieve one or more particular environmental conditions and/or default environmental conditions (e.g. a given lighting level, temperature (which may affect sound via the fan of the environmental device 109-1 making noise)). However, when the controller 220 and/or the computing device 101 communicates with the smart-building control device 105, to control the environmental devices 109 to assist the first responder 113 with respect to the context, such functions of the smart-building control device 105 may generally be overridden by the controller 220 and/or the computing device 101, to achieve environmental conditions that assist the first responder 113, as described above. The environmental conditions that assist the first responder 113, which may be different from current default environmental conditions.

In some examples, the method 300 may further comprise, based on data received from an internet-of-things device of the smart building 103, granting, using the controller 220 and/or the computing device 101, the first responder 113 access to one or more of: the smart building 103; a network of the smart building 103; and one or more devices of the smart building 103.

For example, as described above, an identity of the first responder 113 may be determined at the controller 220 and/or the computing device 101 by receiving, from a camera 111, video data that includes images of the badge 117 (and alternatively the identifier 118 and/or a badge number of the badge 117), and a camera 111 may comprise an IoT device. Furthermore, access to the smart building 103 may occur by determining, from the badge 117 (and alternatively the identifier 118) that the first responder 113 is attempting to enter the smart building 103, and controlling access-control devices accordingly (e.g. unlocking and/or opening a door to the smart building 103). In other words, data from an IoT device (e.g. a camera 111) may be used to identify the first responder 113, specifically and/or generically as a first responder and/or as a public safety officer (e.g. via the badge 117), and access to the smart building 103 may be granted as described above.

Similarly, once the first responder 113 is specifically and/or generically identified as a first responder, devices of the first responder 113 (such as the device 115 and/or the device 116) may be granted access, and/or wireless access, to the control device 105 and/or the cameras 111 such that video data from the cameras 111 may be wirelessly streamed to a device carried by the first responder 113. However, devices of the first responder 113 may be granted access to a network of the smart building 103 and/or any other devices of the smart building 103 including, but not limited to, the environmental control devices 109. For example, while dynamic control of the environmental control devices 109 has been described above with respect to block 304 of the method 300, the first responder 113 may be granted access, and/or wireless access, to the control device 105 and/or a network of the smart building 103, and/or the environmental control devices 109, to manually control the environment of the smart building 103 (e.g. turning lights on or off, adjusting noise levels, unlocking or locking doors) and the like.

While the method 300 has been described with respect to the first responder 113 being a police officer, and contexts and object-of-interest described accordingly, contexts for other types of first responders are within the scope of the present specification. For example, as mentioned above, the method 300 may include: a context for a fire fighter such as an objective to extinguish a fire in a particular room of the smart building 103 and/or to rescue persons, and/or a given person, and/or object from a fire in the smart building 103; and an object-of-interest, for which evidence is to be collected by a fire fighter (and/or devices thereof), such as a person and/or an object that is to be found and/or retrieved and/or rescued from the smart building 103, by the firefighter. Similarly, the method 300 may include: a context for an emergency medical technicians such as an objective to provide medical assistant to persons, and/or a given person, in the smart building 103. Hence, method 300 generally includes the controller 220 and/or the computing device 101 communicating with the smart-building control device 105, to control environmental devices at the smart building 103 to assist a first responder of any suitable type with respect to a context of any suitable type.

Attention is next directed to FIG. 4, FIG. 5, FIG. 6 and FIG. 7, which depict an example of a method for controlling environmental devices at a smart building to assist a first responder, and which are substantially similar to FIG. 1, with like components having like numbers.

Figure 4:
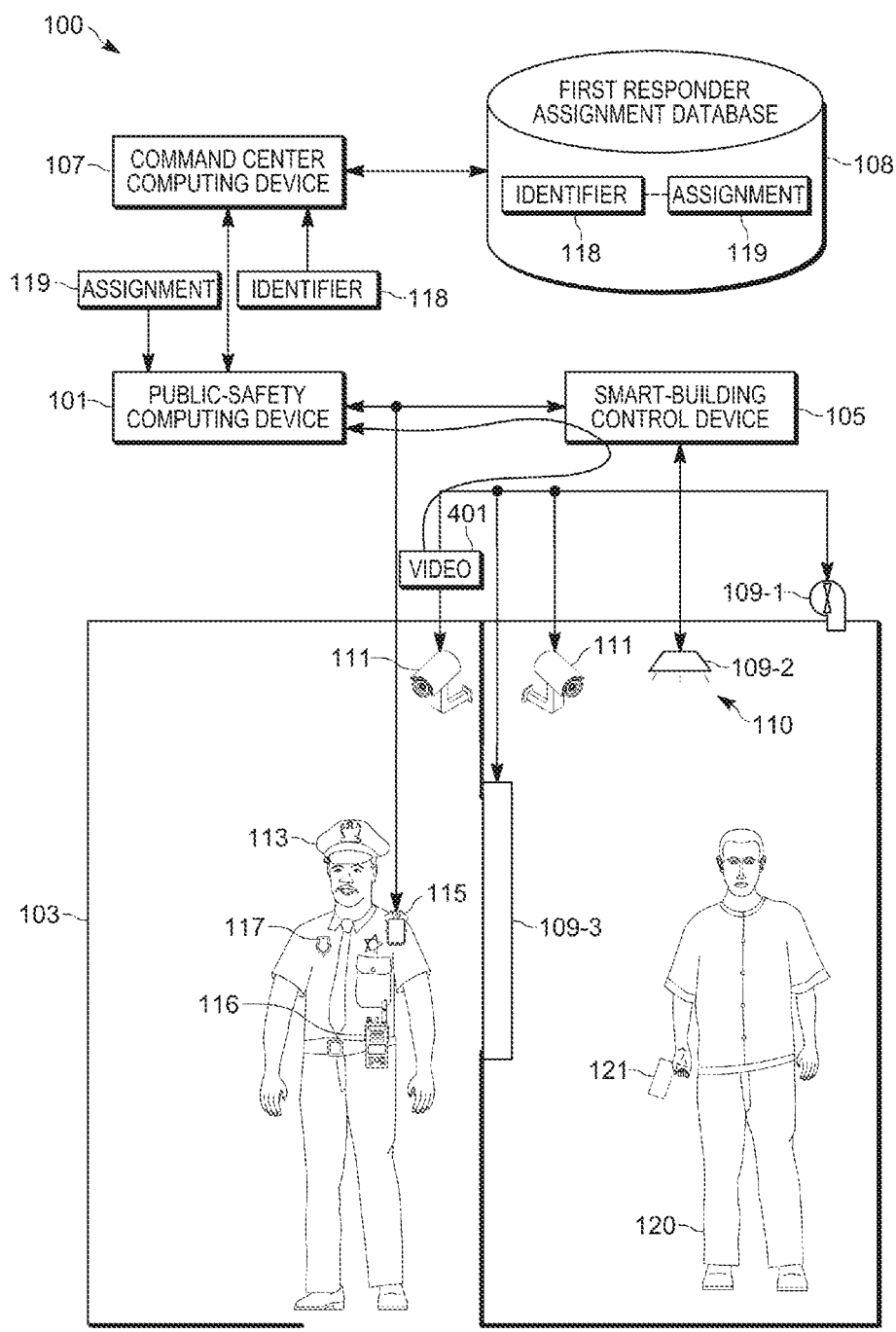
FIG. 4 depicts an example of a method for controlling environmental devices at a smart building to assist a first responder implemented in the system of FIG. 1, in accordance with some examples.

Attention is first directed to FIG. 4, which depicts an example of the computing device 101 determining (e.g. at the block 302 of the method 300) a context of the first responder 113. In particular, as depicted, the first responder 113 has entered the smart building 103 and a camera 111 is outside a room where the suspect 120 is located. A camera 111 is streaming video data 401 to the computing device 101 (e.g. via the control device 105), which, as depicted, is understood to include images of the badge 117 and hence images of the identifier 118. As such, the computing device 101 may determines the identifier 118 from the video data 401 and retrieves the assignment 119 from the database 108 via the command center computing device 107. While not depicted, a similar example may be used to grant the first responder 113 access to the smart building 103, and the like, as described above.

Figure 5:
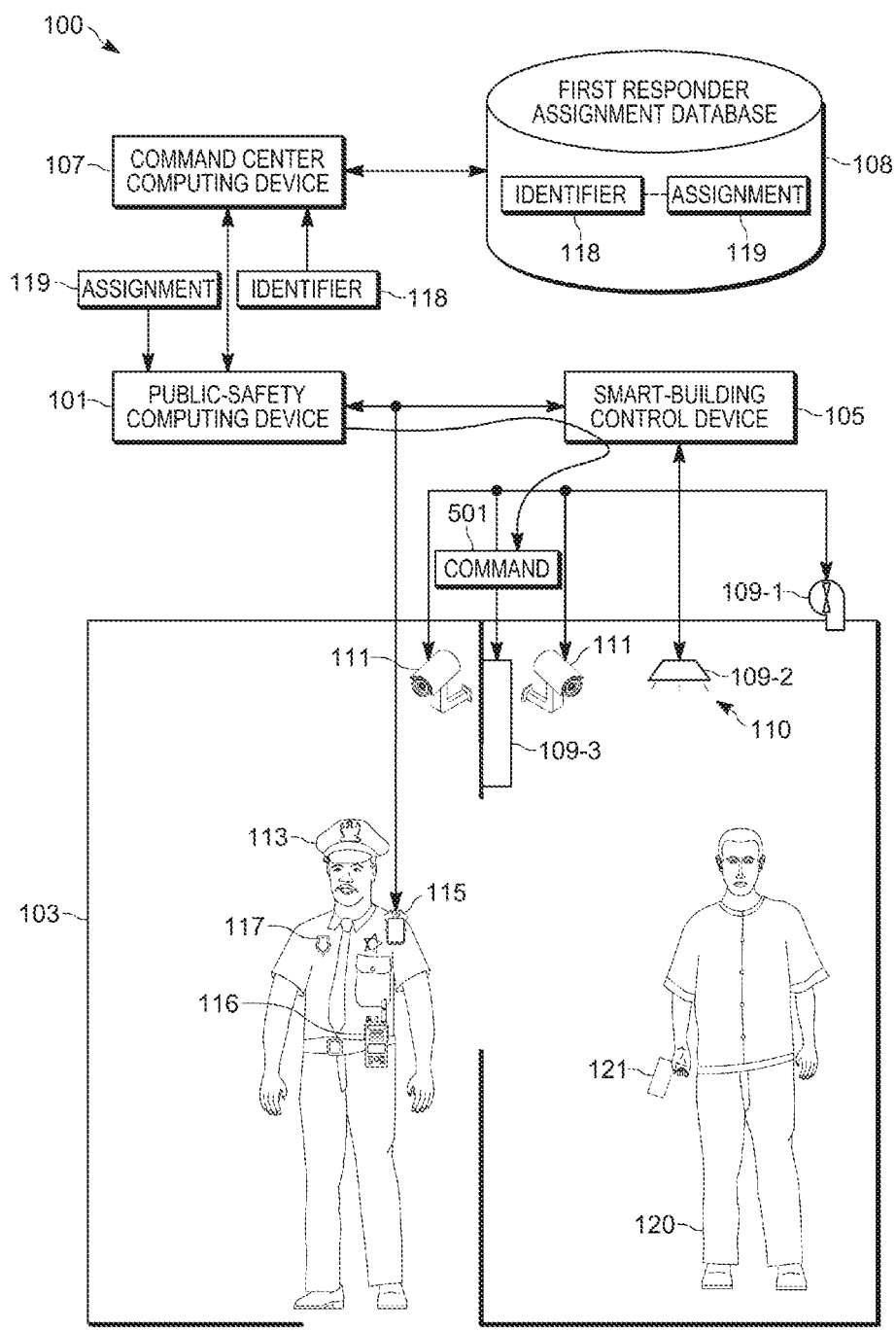
FIG. 5 continues to depict the example of the method for controlling environmental devices at a smart building to assist a first responder implemented in the system of FIG. 1, in accordance with some examples.

Attention is next directed to FIG. 5, which depicts an example of the computing device 101 communicating (e.g. at the block 304 of the method 300) with the smart-building control device 105, to control environmental devices 109 at the smart building 103 to assist the first responder 113 with respect to the context. For example, the assignment 119 may indicate that the first responder 113 is to track the suspect 120 and hence may require access to rooms and/or all rooms of the smart building 103. As such access-control devices are to be opened and/or unlocked, as described above.

For example, as depicted, the computing device 101 communicates with the control device 105 to transmit a command 501 to the environmental device 109-3 to cause the access-control device of the environmental device 109-3 to unlock and/or, as depicted, open, such that the first responder 113 may enter the room where the suspect is located.

Figure 6:
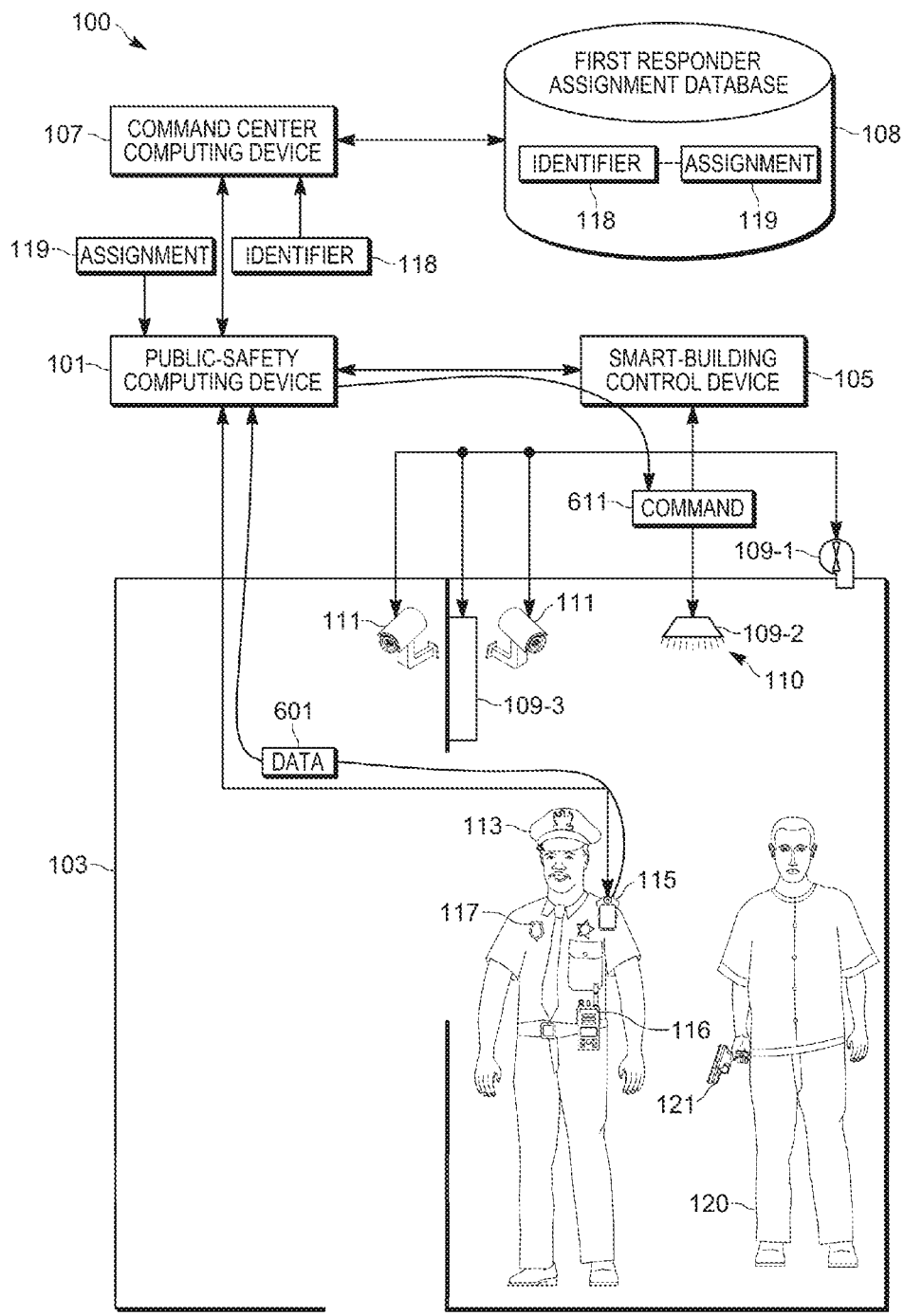
FIG. 6 continues to depict the example of the method for controlling environmental devices at a smart building to assist a first responder implemented in the system of FIG. 1, in accordance with some examples.
Figure 7:
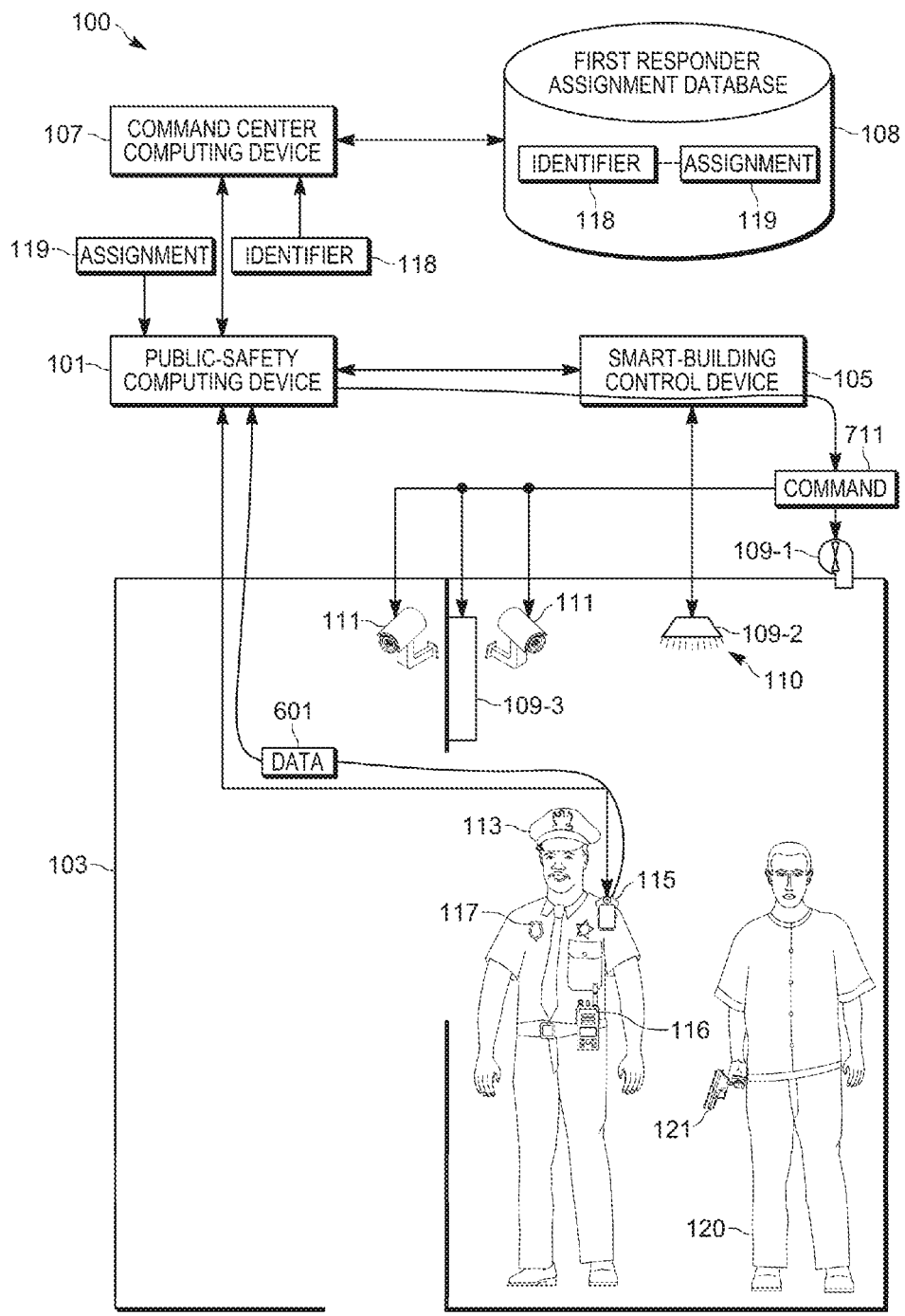
FIG. 7 continues to depict the example of the method for controlling environmental devices at a smart building to assist a first responder implemented in the system of FIG. 1, in accordance with some examples.

Attention is next directed to FIG. 6, which depicts the first responder 113 in the room where the suspect 120 is located. FIG. 6 depicts another example of the computing device 101 communicating (e.g. at the block 304 of the method 300) with the smart-building control device 105, to control environmental devices 109 at the smart building 103 to assist the first responder 113 with respect to the context. For example, the assignment 119 may also indicate that the first responder 113 is to identify the object 121 and/or collect evidence about the object 121, and lighting in the room where the suspect 120 and the object 121 is located may be controlled such the object 121 may be identified. For example, with brief reference back to FIG. 5 (and/or FIG. 4 and/or FIG. 1), the object 121 is depicted as being a generally rectangular shape and it is generally understood that the lighting in the room where the suspect 120, and the object 121, is located is too dark to identify the object 121.

However, returning to FIG. 6, data 601 from the device 115 (e.g. a BWC) may be streamed to the computing device 101, which may compare images in the data 601 (e.g. the data 601 may comprise video data) to a threshold condition that includes a lighting level, as described above. The computing device 101 may determine that the images in the data 601 do not meet the threshold condition. As depicted, the computing device 101 may responsively communicate with the control device 105 to transmit a command 611 to the environmental device 109-2 to cause the lighting device of the environmental device 109-2 to increase light 110 emitted until the object 121 may be identified in the data 601 and/or such that the first responder 113 may visually identify the object 121. For example, as depicted in FIG. 6, the object 121 is now identifiable as a weapon (e.g. a gun). In some examples, the computing device 101 may identify the object as a weapon and transmit a warning to the mobile radio device 116 to warn the first responder 113 and/or the first responder 113 may visually identify the object 121 as a weapon and respond accordingly.

Attention is next directed to FIG. 7, which again depicts the first responder 113 in the room where the suspect 120 is located. FIG. 7 depicts another example of the computing device 101 communicating (e.g. at the block 304 of the method 300) with the smart-building control device 105, to control environmental devices 109 at the smart building 103 to assist the first responder 113 with respect to the context. In particular, similar to FIG. 6, FIG. 7 depicts the device 115 (e.g. a BWC) streaming the data 601 to the computing device 101, which may compare audio in the data 601 (e.g. the data 601 may comprise audio data) to a threshold condition that includes a sound level and/or noise level, as described above. The computing device 101 may determine that audio data in the data 601 does not meet the threshold condition. As depicted, the computing device 101 may responsively communicate with the control device 105 to transmit a command 711 to the environmental device 109-1 to cause the fan of the environmental device 109-1 to decrease sound until the audio data in the data 601 meets the threshold condition. In yet further examples, the fan of the environmental device 109-1 may be controlled to remove smoke, and the like, from the room, to improve images of the data 601, for example when video data and/or images in the data 601 indicates smoke in the room where the suspect 120 is located and/or when smoke is detected via a smoke detector and/or a camera 111.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   determining, at a public-safety computing device, a context of a first responder at a smart building, the public-safety computing device in communication with a smart-building control device, the context comprising one or more of: an objective to be achieved by the first responder in the smart building; and an object-of-interest in the smart building for which evidence is to be collected; and
   communicating, at the public-safety computing device, with the smart-building control device, to control environmental devices at the smart building to assist the first responder with respect to the context, wherein communicating with the smart-building control device, to control the environmental devices to assist the first responder with respect to the context, comprises one or more of:
   controlling a lighting device to increase light emitted;
   controlling the lighting device to decrease the light emitted;
   controlling the lighting device to change a lighting parameter;
   controlling a sound-making device to increase sound emitted;
   controlling the sound-making device to decrease the sound emitted;
   controlling an access-control device to permit access by the first responder;
   controlling the access-control device to deny access to a suspect being tracked by the first responder;
   controlling a heating, ventilation, and air conditioning (HVAC) device to one or more of: increase or decrease respective sound emitted; decrease smoke; prevent air circulation one or more of to and from a defined space of the smart building; control the air circulation one or more of to and from the defined space of the smart building;
   moving one or more movable walls;
   opening one or more blinds; and
   closing one or more blinds.

2. The method of claim 1, wherein determining the context occurs upon one or more of: dispatch of the first responder to a public-safety incident associated with the smart building; arrival by the first responder at the smart building; and entry by the first responder to the smart building.

3. The method of claim 1, wherein one or more of the objective and the object-of-interest are associated with a public-safety incident at the smart building, the first responder being one or more of associated with the public-safety incident and dispatched to the public-safety incident.

4. The method of claim 1, wherein determining the context of the first responder at the smart building comprises one or more of: receiving context data from a first responder communication device as carried by the first responder;
   receiving the context data from a command center computing device;
   receiving video data from cameras deployed in the smart building; and
   determining an identity of the first responder from one or more of: the video data from the cameras deployed in the smart building and communication with the command center computing device.

5. The method of claim 1, the environmental devices at the smart building comprise one or more of:
   the lighting device;
   a light;
   a sound-making device;
   a heating, ventilation, and air conditioning (theHVAC device;
   a speaker;

the access-control device;
a door lock;
an elevator;
the one or more movable walls; and
the one or more blinds.

6. The method of claim 1, further comprising:
determining a quality of data collected by a first responder device, the data defined with respect to the context; and
in response to determining that the quality of the data fails a threshold condition, communicating with the smart-building control device, to control one or more of the environmental devices to one or more of:
improve the quality of the data; and improve the quality of the data to meet the threshold condition.

7. The method of claim 1, further comprising:
receiving a stream-of-data from a first responder device, the stream-of-data defined with respect to the context; and
communicating with the smart-building control device, in a feedback loop, to control one or more of the environmental devices to improve a quality of the stream-of-data.

8. The method of claim 1, wherein communicating with the smart-building control device, to control the environmental devices to assist the first responder with respect to the context, comprises: controlling one or more specific lights of the smart building to adjust a local lighting level to illuminate an object held by a person in the smart building, the person defined by the context.

9. The method of claim 1, further comprising:
tracking a location of the first responder in the smart building; and
communicating with the smart-building control device, to control one or more of the environmental devices to assist the first responder with respect to the context comprises: controlling the environmental devices with respect to the location of the first responder in the smart building.

10. The method of claim 1, wherein communicating with the smart-building control device, to control the environmental devices to assist the first responder with respect to the context comprises: overriding one or more functions of the smart-building control device.

11. The method of claim 1, further comprising:
based on data received from an internet-of-things device of the smart building, granting the first responder access to one or more of: the smart building; a network of the smart building; and one or more devices of the smart building.

12. A public-safety computing device comprising:
a communication unit configured to communicate with a smart-building control device; and
a controller; and
a computer-readable storage medium having stored thereon program instructions that, when executed by the controller, causes the controller to perform a set of operations comprising:
determining a context of a first responder at a smart building, the context comprising one or more of: an objective to be achieved by the first responder in the smart building; and an object-of-interest in the smart building for which evidence is to be collected; and
communicating, via the communication unit, with the smart-building control device, to control environmental devices at the smart building to assist the first responder with respect to the context,
wherein the controller is communicatively coupled to the smart-building control device, and the set of operations further comprises controlling the environmental devices to assist the first responder with respect to the context, by one or more of:
controlling a lighting device to increase light emitted;
controlling the lighting device to decrease the light emitted;
controlling the lighting device to change a lighting parameter;
controlling a sound-making device to increase sound emitted;
controlling the sound-making device to decrease the sound emitted;
controlling an access-control device to permit access by the first responder;
controlling the access-control device to deny access to a suspect being tracked by the first responder;
controlling a heating, ventilation, and air conditioning (HVAC) device to one or more of: increase or decrease respective sound emitted; decrease smoke; prevent air circulation one or more of to and from a defined space of the smart building;
control the air circulation one or more of to and from the defined space of the smart building;
moving one or more movable walls;
opening one or more blinds;
closing one or more blinds; and
controlling one or more specific lights of the smart building to adjust a local lighting level to illuminate an object held by a person in the smart building, the person defined by the context.

13. The public-safety computing device of claim 12, wherein one or more of the objective and the object-of-interest are associated with a public-safety incident at the smart building, the first responder being one or more of associated with the public-safety incident and dispatched to the public-safety incident.

14. The public-safety computing device of claim 12, wherein the the set of operations further comprises determining the context of the first responder at the smart building by one or more of: receiving context data from a first responder communication device as carried by the first responder;
receiving the context data from a command center computing device;
receiving video data from cameras deployed in the smart building; and
determining an identity of the first responder from one or more of: the video data from the cameras deployed in the smart building and communication with the command center computing device.

15. The public-safety computing device of claim 12, wherein the set of operations further comprises:
determining a quality of data collected by a first responder device, the data defined with respect to the context; and
in response to determining that the quality of the data fails a threshold condition, communicating with the smart-building control device, to control one or more of the environmental devices to one or more of: improve the quality of the data; and improve the quality of the data to meet the threshold condition.

16. The public-safety computing device of claim 12, wherein the set of operations further comprises:
receiving a stream-of-data from a first responder device, the stream-of-data defined with respect to the context; and communicating with the smart-building control device, in a feedback loop, to control one or more of the environmental devices to improve a quality of the stream-of-data.

17. The public-safety computing device of claim 12, wherein the set of operations further comprises:

tracking a location of the first responder in the smart building; and communicating with the smart-building control device, to control one or more of the environmental devices to assist the first responder with respect to the context comprises: controlling the environmental devices with respect to the location of the first responder in the smart building.

18. The public-safety computing device of claim 12, wherein the set of operations further comprises communicating with the smart-building control device, to control the environmental devices to assist the first responder with respect to the context by: overriding one or more functions of the smart-building control device.

19. A method comprising:

determining, at a public-safety computing device, a context of a first responder at a smart building, the public-safety computing device in communication with a smart-building control device, the context comprising one or more of: an objective to be achieved by the first responder in the smart building; and an object-of-interest in the smart building for which evidence is to be collected;

communicating, at the public-safety computing device, with the smart-building control device, to control environmental devices at the smart building to assist the first responder with respect to the context;

determining a quality of data collected by a first responder device, the data defined with respect to the context; and in response to determining that the quality of the data fails a threshold condition, communicating with the smart-building control device, to control one or more of the environmental devices to one or more of:

improve the quality of the data; and improve the quality of the data to meet the threshold condition.

* * * * *